Mar. 6, 1923.
C. E. CHANEY
1,447,236
MAGNETIC REPULSION OR ATTRACTION RELAY
Filed Dec. 15, 1920
2 sheets-sheet 2
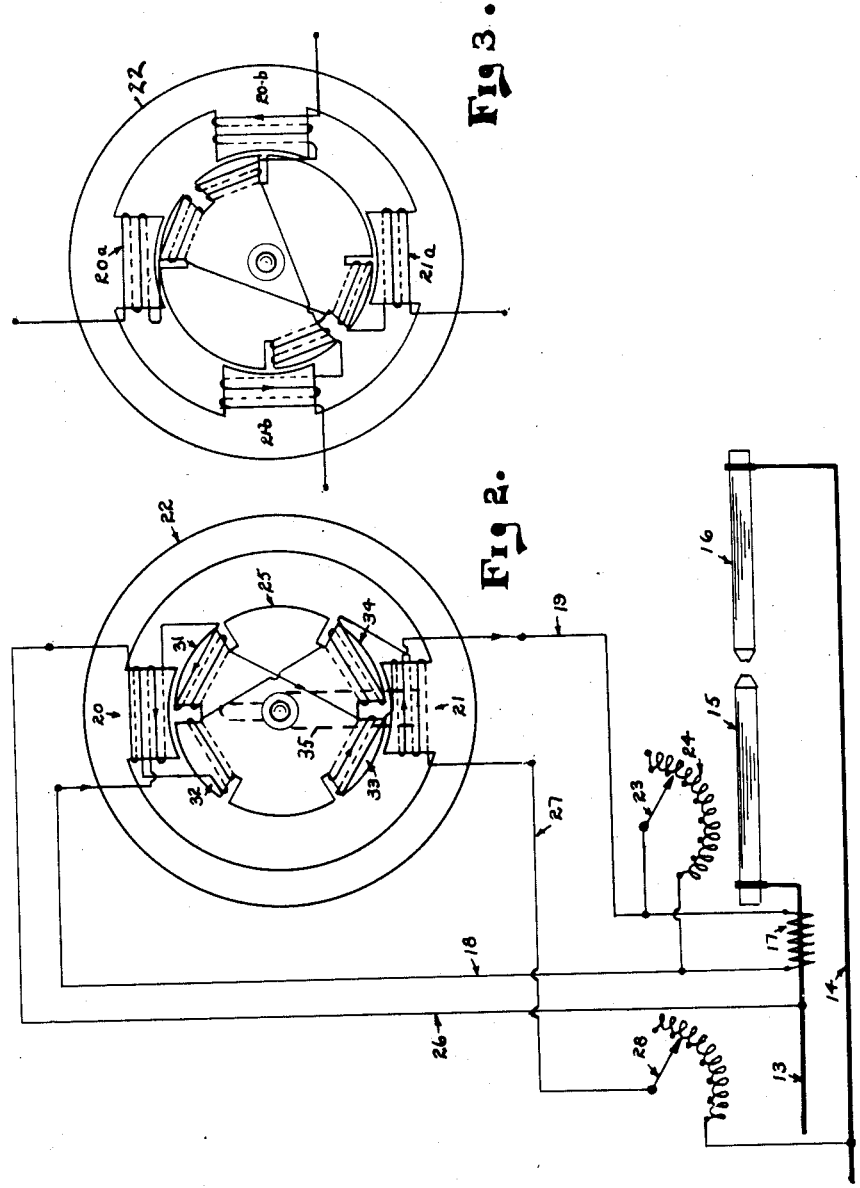
Caryl E. Chaney INVENTOR Patented Mar. 6, 1923.

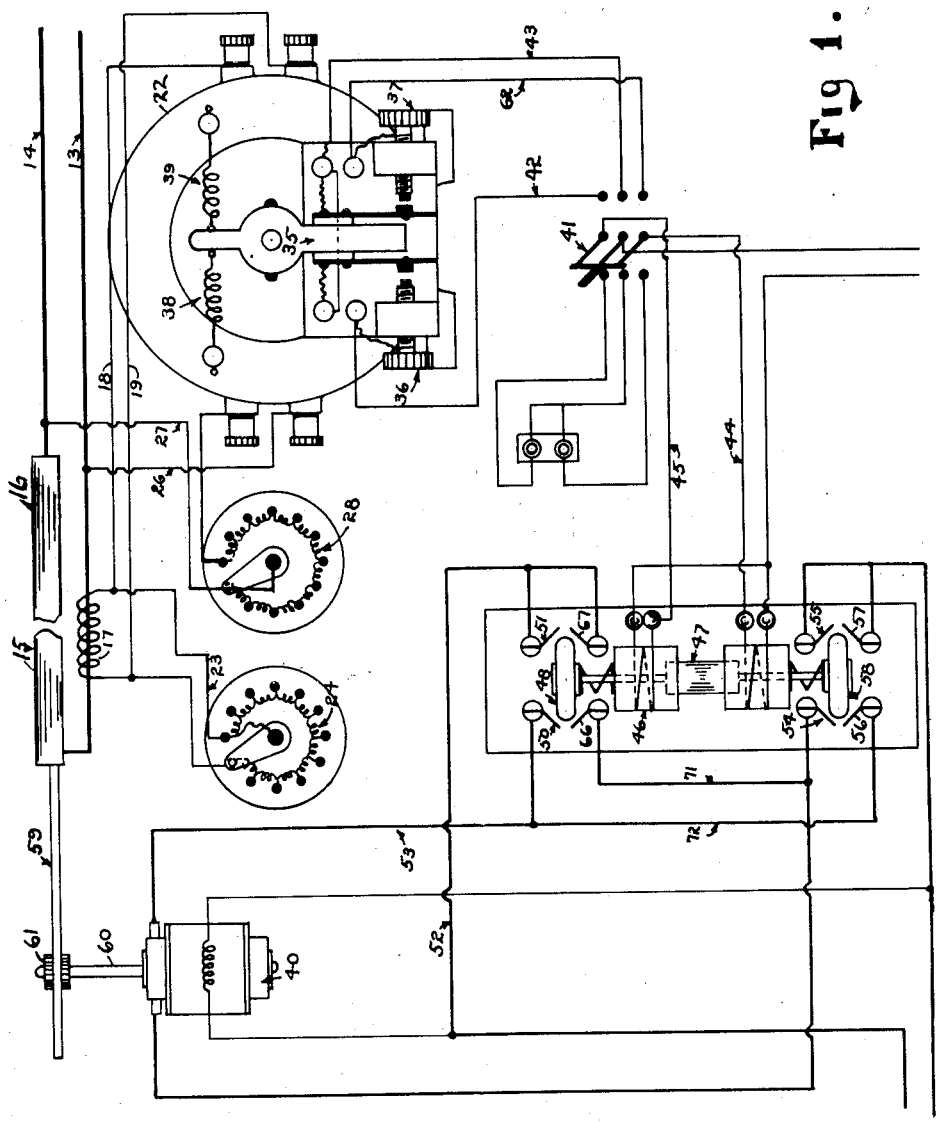

1,447,236

UNITED STATES PATENT OFFICE.

CARYL E. CHANEY, OF DETROIT, MICHIGAN.

MAGNETIC REPULSION OR ATTRACTION RELAY.

Application filed December 15, 1920. Serial No. 431,023.

*To all whom it may concern:*

Be it known that I, CARYL E. CHANEY, a citizen of the United States, residing at Detroit, in the county of Wayne and State of Michigan, have invented a certain new and useful Improvement in Magnetic Repulsion or Attraction Relays, and declare the following to be a full, clear, and exact description of the same such as will enable others skilled in the art to which it pertains to make and use the same, reference being had to the accompanying drawings, which form a part of this specification.

This invention relates to magnetic repulsion or attraction relays for automatically maintaining within predetermined limits the electrical energy input into an electric furnace, oven, or similar apparatus. I employ for this purpose rotor and stator elements which derive their current from auxiliary circuits, which are dependent upon the main or heating circuit whose possible variations it is desired to regulate; the operative theory of my device centering about the location upon the rotor and stator elements, which are yieldingly held in neutral position relatively to one another, of windings which, when excited, develop characteristic polarity in their parts adjacent to one another, such that the tendency of the excited stator member is to repel or attract from its magnetic poles the corresponding pole or poles of the excited rotor member. The resultant movement of the rotor relatively to the stator is sufficient to swing its contact arm against one or the other of a pair of conveniently located contacts, thereby initiating changes in the circuit arrangements which result in a corresponding change of the electric condition which has led to the excitation of the stator and rotor poles, and, due to the circular character of the stator and of the rotor, uniformity in the air gap between them is maintained regardless of how much or how slightly the rotor is actuated.

In the drawings,

Figure 1 is a more or less diagrammatic elevational view of my improved apparatus, showing its application to a motor by means of which the electrodes of a heating furnace have the distance between them varied;

Figure 2 is a combined elevational view and diagrammatic showing of the details of a stator and rotor, with their corresponding connections to the main circuit shown; and Figure 3 is a view similar to the corresponding part of Figure 2, of a slightly modified form of stator member, wherein two pairs or sets of poles are employed, located at ninety (90) degrees from one another.

13 and 14 represent the main or line wires, by means of which the electrodes 15 and 16 are energized, it being understood that the regulation of the difference in the distance between these electrode tips is here selected as illustrative of one of the several uses to which my invention can be put. Connected with one of these wires, as 13, is the circuit or series transformer 17, whose wires 18 and 19 encircle the two poles 20 and 21 of the stator 22, in a way to energize them, so that, for example, the pole 20 may be considered as the north pole and the pole 21 as the south pole. Interposed in the wire 19 is the branch 23 leading to the adjustable resistance 24. As brought out in Figure 2 particularly, the wire 18, after encircling the pole 20 of the stator crosses over to the rotor 25, where it likewise encircles the poles 31 and 33, and passes thence over to and about the pole 21 of the stator, and continues as wire 19 back to the circuit or series transformer 17.

Also leading from the main wire 13 is the current wire 26, which, after encircling the pole 20 of the stator, passes over to the rotor 25, where it encircles the poles 32 and 34 thereof, after which it passes over to the poles 21 of the stator and returns through the resistance 28 to the main or line wire 14. Upon energization of either one of these circuits, one or the other of the poles 31 and 32 of the rotor is repelled or attracted from or to the stator pole 20, and one or the other of the rotor poles 32 or 34 is repelled or attracted from or to the adjacent stator pole 21, the rotor being in the neutral or balanced position relatively to the stator when the energization of the potential circuit and of the current circuit is equal. When, however, either the current or the potential predominates, as would be the case, for example, when the tips of the electrodes have burned off to a degree sufficient to materially change the length of the arc between them, or when the electrodes are open to an extent sufficient to extinguish the arc, the energization of the pole of the stator through the wires 18 and 19 or 26 and 27, results in setting up an opposition between it and one of the adjacent north poles upon the rotor $\frac{1}{m}$ as, 31 or 32, thereby turning the rotor sufficiently to throw its contact arm 35, which has hitherto maintained a neutral position between the adjustable terminals 36 and 37, against one of them, as, for example, 36, against the pull of its anchoring spring 38.

As brought out particularly in Figure 1, the desired actuation of the motor 40 to effect the longitudinal movement of one electrode toward or away from its companion electrode (and only one of these electrodes need be movable) is brought about by the contact arm 35 swinging against one terminal, as, for example, 36. With the switch 41 thrown into contact with the right-hand set of terminals shown in Figure 2, the circuit through the wires 42, 43, 44 and 45, is closed in a way to energize the coil 46, thereby causing the raising of its plunger 47 and forcing its laterally-spread contact top 48 into engagement with the upper contact clips 50 and 51, and similarly bringing its lower contact piece 58 into engagement with the similar spring clips 54 and 55, thereby closing the circuit through the wires 52 and 53 and actuating the motor 40 so that the rotation of its shaft 60 carrying the gear-wheel 61 acts upon the correspondingly toothed portion of the electrode projecting and retracting rod 59.

The instant that the engagement of the contact arm 35 against the terminals 36 has taken place, however, the hitherto dominant current influence upon the poles of the rotor is broken in upon, and under the pull of the spring 39 upon the contact arm 35 the rotor swings once more towards its neutral position; thereby breaking the contact of the arm 35 with the terminal 36, thus breaking the circuit whose establishment has just been described. The adjusting rotation of the motor 40 consequently ceases, and with it the further projection or retraction of the electrode.

Upon drawing the electrodes sufficiently far apart to break the arc, current is supplied through the wires 26 and 27, thereby exciting the stator pole 20, and the rotor poles 32 and 34 and the stator coil 21, and causing the rotor to swing in the opposite direction from that just described, and against the terminal 37. This results in the closing of the circuit through the wires 43, 62 and 44, and consequently energizes the contactor coil in a way to force its spreading terminal 58 against the spring contacts 56 and 57, and also closing the opposite set of spring contacts 66 and 67. This closes a circuit through the wires 71 and 72 in a way to energize the motor 40 in the opposite direction from that hitherto described. Similarly, the moment the changed conditions, due to the making of this contact between the arm 35 and the terminals 36, have come into effect, and resulted in shutting off from further continuance the predominance of the conditions which permitted the swing of the motor in that direction, the pull of the spring 39 upon the contact arm 35 tends to draw it away from engagement with the adjustable terminal 37, and the rotor is swung toward its desired neutral position once more.

I have shown in Figure 3 a slightly modified form of stator member, wherein, instead of a single pair of poles, I employ two pairs, as $20^a$ and $21^a$, and $20^b$ and $21^b$, the arrangement of the poles and windings on the rotor member remaining the same as in the form already described. In this form, instead of the neutral position of the two rotor poles being on each side of the central axis of the stator poles, they are located between the two corresponding poles of the stator; one of the windings, as, for example, the potential, is arranged about one pair of poles as $20^a$ and $21^a$, and the other or current winding, is similarly disposed about the poles $20^b$ and $21^b$.

What I claim is:

1. In combination with a stator member provided with oppositely disposed poles, current and potential windings arranged about said poles, a rotor member operatively disposed with reference to said stator member, provided with a plurality of poles, each oppositely disposed with respect to its companion pole on the rotor, and each pair of poles having also arranged about it one or the other of said windings, resilient means for normally holding the poles of similar character on the rotor equally disposed with respect to the corresponding stator pole, a contact arm carried by said rotor member, a plurality of normally open circuits, one or another of which is adapted to be closed by the engagement of said contact arm against its terminals, a contactor coil provided with a plurality of sets of terminals for selective closure, and a reversible member adapted to be energized in a direction and to a degree determined by the closure of one or another of said sets of terminals.

2. In combination with an electric circuit, a current-consuming device certain of whose connected members are adapted to be moved relatively to others, a reversible motor member for actuating the movable member of said current consuming device in either direction, a contactor device having a plurality of sets of contact terminals, operatively connectible with said reversible motor member, a stator member and a rotor member of oppositely disposed polarity with reference to said stator member, potential and current windings for said stator and rotor members, adapted to energize the poles of the rotor member and to thereby effect the movement of the rotor member relatively to the stator member in opposing directions, and a plurality of normally open circuits operatively connected with said contactor device and adapted to be closed by the engagement of a projecting portion of said rotor member against the terminals of one or the other of said circuits, according to the predominance of the energy in the current windings or in the potential winding in said rotor member, thereby energizing said contact device accordingly.

3. The combination, with a current-consuming device, of an electric supply circuit connected therewith, a correlated stator member and rotor member operatively disposed with reference to each other, a current circuit and a potential circuit each of which leads from said electric supply circuit about the poles of said stator member and of said rotor member, terminals for said circuit with which selected parts of said rotor member are normally out of engagement, means for yieldingly holding said rotor member in neutral position with respect to said terminals, and means rendered active by the swing of said rotor member against one or the other of said terminals according to the predominance of electric energy in one or the other of said circuit windings on said rotor member, whereby the parts of the current-consuming device are adjusted relatively to one another.

4. In combination with a relay having a stator member, a rotor member, and current and potential windings selectively disposed about each member in position to induce relative movement of the rotor member with respect to stator member, normally open circuits adapted to be closed by the swing of the rotor, a contactor device provided with a plurality of sets of terminals for selective closure in response to the closure of one or the other of said normally open circuits, and an actuating member operatively connected therewith in a way to have its direction of motion regulated by the closure of said terminals of the contactor device.

5. In combination with a current consuming device, an electric supply circuit connected therewith, means for moving selected ones of the elements of said current consuming device relatively to the other elements, a contactor device operatively connected with said last-mentioned means, a relay member normally out of operative connection with said contactor device, and current and potential windings selectively leading from said electric supply circuit about the rotor and stator elements whereby the former is thrown into operative relation with said contactor device according to the predominance of the energy in the potential or in the current windings upon the relatively movable parts of said relay.

6. A relay having, in combination, current and potential windings, a stator member having oppositely disposed poles encircled by each of said windings, and a rotor member having a plurality of poles, certain of which are encircled by said potential winding and certain others of which are encircled by said current windings, whereby the rotor is actuated in opposite directions relatively to the poles of the stator, according to the predominance of the electrical energy passing through said windings.

7. In a relay, the combination, with a stator member, of current and potential windings disposed about the poles thereof, and a rotor member provided with a plurality of poles about one or the other of which each of said windings is disposed, thereby effecting a movement of the rotor relatively to the stator according to the predominance of the electrical energy in one of said windings as compared with that in the other.

8. In a relay, the combination, with current and potential windings, of a stator member whose poles are encircled thereby, and a rotor member having a plurality of poles, certain of which are encircled by the potential windings and certain others of which are encircled by the current windings, whereby, upon the attainment of predominance of either due to the electrical energy passing therethrough, the rotor is actuated relatively to the stator against adjacently located terminals.

9. In a relay, the combination of a rotor member and a stator member operatively associated with one another, each being provided with a plurality of poles, current windings and potential windings disposed about the poles of said members, being jointly associated with each pole of the stator and each being individually disposed relatively to selected poles of the rotor member, and being thereby adapted to energize the rotor in opposing directions according to the predominance of electrical energy in one or the other winding.

In testimony whereof, I sign this specification in the presence of two witnesses.

CARYL E. CHANEY.

Witnesses:
WILLIAM M. SWAN,
EDWARD P. ECHLIN.